(12) United States Patent
Ray et al.

(10) Patent No.: US 9,388,996 B2
(45) Date of Patent: Jul. 12, 2016

(54) AIR CURTAIN HVAC SYSTEM

(71) Applicants: Isaac Ray, Brooklyn, NY (US); David Brown, Alpine, NJ (US); Igor Beyder, Alpine, NJ (US)

(72) Inventors: Isaac Ray, Brooklyn, NY (US); David Brown, Alpine, NJ (US); Igor Beyder, Alpine, NJ (US)

( * ) Notice: Subject to any disclaimer, the term of this patent is extended or adjusted under 35 U.S.C. 154(b) by 99 days.

(21) Appl. No.: 14/261,137

(22) Filed: Apr. 24, 2014

(65) Prior Publication Data

US 2014/0318375 A1    Oct. 30, 2014

Related U.S. Application Data

(60) Provisional application No. 61/816,117, filed on Apr. 25, 2013.

(51) Int. Cl.
```
B03C 3/34      (2006.01)
F24F 9/00      (2006.01)
B03C 3/16      (2006.01)
B03C 3/41      (2006.01)
```
(52) U.S. Cl.
CPC ... *F24F 9/00* (2013.01); *B03C 3/16* (2013.01); *B03C 3/41* (2013.01); *B03C 2201/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,855,762 A * | 10/1958 | Zehnder | ............ | F24F 9/00 454/188 |
| 3,018,712 A * | 1/1962 | Wacker | ............ | F24F 9/00 236/38 |
| 3,308,740 A * | 3/1967 | Henson | ............ | F24F 9/00 454/188 |
| 4,967,645 A * | 11/1990 | Mattson | ............ | F24F 9/00 15/316.1 |
| 6,106,387 A * | 8/2000 | Smith | ............ | F24F 9/00 454/190 |
| 7,641,545 B2 | 1/2010 | Chen et al. | | |
| 8,206,475 B2 | 6/2012 | Walkinshaw | | |

FOREIGN PATENT DOCUMENTS

GB           1271205 A *   4/1972  .............. F24F 3/044

* cited by examiner

*Primary Examiner* — Duane Smith
*Assistant Examiner* — Sonji Turner
(74) *Attorney, Agent, or Firm* — Michael J. Brown (57) ABSTRACT

An improved HVAC system is provided for the delivery of a temperature controlled air supply via one or more air curtains provided at windows, doors and walls. The air curtains create a double layer of insulation over the surface of a window, door or wall. The invention provides for the use of the temperature controlled air flow from the air curtain to directly affect the interior room temperature. The invention provides an improved system for continuous cleaning the recycled air through the use of a wet electrostatic precipitator in the HVAC air flow, as well as providing a higher speed mode for the air curtain to prevent the inflow of particles and contaminants from outside of the building, when windows or doors are open. The invention may be installed on existing construction, or incorporated as part of new construction.

13 Claims, 10 Drawing Sheets

AIR CURTAIN HVAC SYSTEM

FIELD OF INVENTION

A system is proposed for a central heating, ventilation and air conditioning (HVAC) system for residential and commercial buildings that will save energy for ventilation, heating or cooling by changing the thermal resistance R-value of the structural elements of the building, and also deliver clean air to the interior room environment. The proposed system will allow windows to be kept open, if desired, while preventing contaminants, dust and insects from entering the interior environment.

BACKGROUND

Contemporary HVAC systems are based on a combination of recycled air as well as the intake of ambient "clean and fresh" air that in reality may contain a variety of impurities and particulate matter, including pollutants, carcinogenic compounds, volatile organic compounds from vehicle exhaust, and a long list of toxic chemicals from any number of industrial sources. These impurities and particulate matter may be delivered by wind and precipitation, traveling from far distances, and contaminate the air and exterior spaces around the buildings. After airborne impurities and particulate matter enter a building, the concentration of such pollutants increases and may only be alleviated currently by the use of filters and similar devices. Recent data demonstrates that indoor contamination of pollutants can be up to seven times higher than outdoors.

Even such perceived "harmless" exhaust from a laundry dryer may contain up to 600 toxic chemicals, many and of them being carcinogenic coming from chemicals in detergents.

Conventional HVAC systems employ air cleaning devices such as dry electrostatic precipitators and filters that at best remove only dust particles, but do not remove or isolate the long list of pollutants identified above. Such conventional systems also require manual cleaning and periodic replacement of filter media. Such extensive maintenance makes the use of conventional systems impractical. Failure to clean these systems and/or to replace the filter media can drastically reduce the efficiency of these systems due to high pressure drop on the filters.

Existing HVAC systems circulate heated or cooled air from the air handling unit and return it back to the air handling unit, in both cases via registers located on the floors and walls. The current locations of such registers is not the optimum place for proper temperature control, as most energy losses take place at the windows and doors, where registers are not able to be located.

Further, temperature exchanges often occur along exterior facing walls, windows and doors, bringing interior temperatures closer to the temperatures outside of a building. These temperature exchanges or thermal energy losses increase the cost of operating HVAC systems in a building. As is known in the field of building construction, the use of insulating materials can decrease such temperature exchanges, but for existing structures, it may not be cost-effective to replace existing materials or add insulation within walls.

The thermal energy losses, both heat and cold, can be very substantial through windows in a building. The level of energy loss depends on several factors, including the quality of manufacture, materials used, and design. Windows can account for approximately 30% of the total thermal energy loss of a building. As the latest architectural practice calls for allocating at least 40% of exterior walls for windows, the potential for thermal energy loss can only increase.

The energy losses are inversely proportional to the thermal resistance R, meaning that the larger the value of R, the less energy will be lost.

The thermal energy losses for a particular material are directly proportional to the heat transfer coefficient K. For a single pane glass window K=0.96, but for double paned glass conventional windows K=0.27 for the windows, with the layer of air between the window panes having a K=0.024. It is evident from these values that adding an air blanket above the glass window will further reduce the energy losses by 0.27/0.024 or 11.25 times.

Conventional air curtains are commonly used in industrial applications where there is a need or desire to have open doors, while maintaining thermally distinct areas on each side of the door. An example of such use appears in at building entrances or cold storage rooms, where there is heavy truck or fork lift traffic in and out of the buildings or cold storage rooms.

Existing air curtains are high velocity blowers located in a large housing above the door producing substantial noise and requiring frequent cleaning and maintenance. Conventional air curtains are based on traditional electrically driven blowers located in the housing placed above the desired location. In addition to their bulk and being esthetically undesirable in the residential interior setting, these blowers are also noisy, require frequent cleaning and other routine maintenance as is usually required for high speed rotating machinery. Even a small amount of dirt on the surface of the high speed rotating rotor creates dynamic misbalance leading to high noise and eventual damage to or destruction of the unit. Existing air curtain systems are not feasible for use in residential or commercial office buildings. The proposed invention eliminates the problems of existing air curtain systems.

According to the present invention, the air circulated through the HVAC system is delivered into the interior of a building as an air curtain to prevent thermal energy exchanges between the interior and exterior of a building, and at the same time also uses the air curtain as a pollutant and insect barrier for open windows and/or doors.

SUMMARY OF THE INVENTION

The invention relates to the improvements in the field of HVAC and indoor air pollution control, specifically providing a new and improved system for the delivery of a temperature controlled air supply via air curtains located at windows, doors and walls. The present invention also provides an improved system for cleaning the recycled air through the use of a wet electrostatic precipitator in the HVAC air flow, providing continuous air cleaning, without the problems of down time or labor for cleaning and replacement, and providing close to 100% efficiency in cleaning pollutants, particulate matter as small as 0.01 micron, bacteria and viruses from the air flow.

The invention creates a double air blanket, preferably on the interior of a window, door or wall, where one air blanket is an air stream of an air curtain and the other air blanket is an air gap between the surface of the window, door or wall and the air curtain stream.

According to the invention, the air supply operates in two modes, one for creating a slow moving air curtain blanket in front of a closed window or door or a wall, and a second mode to create much faster air curtain in front of an open window or door. An alternate embodiment of the invention provides for an air curtain along a window or paned door, the air curtain being encapsulated by an additional pane of glass.

The basic climate control technology for a building using the proposed invention is similar to the conventional HVAC systems using thermostats to control heating and cooling units. As conventional HVAC systems utilize low velocity air flow delivery, the present invention provides for greater energy efficiency over existing air curtain systems.

The present invention provides energy savings directly attributed to the diminished amount of thermal energy exchange between the exterior and interior of the building.

DETAILED DESCRIPTION OF THE PREFERRED EMBODIMENT

Figure 1:
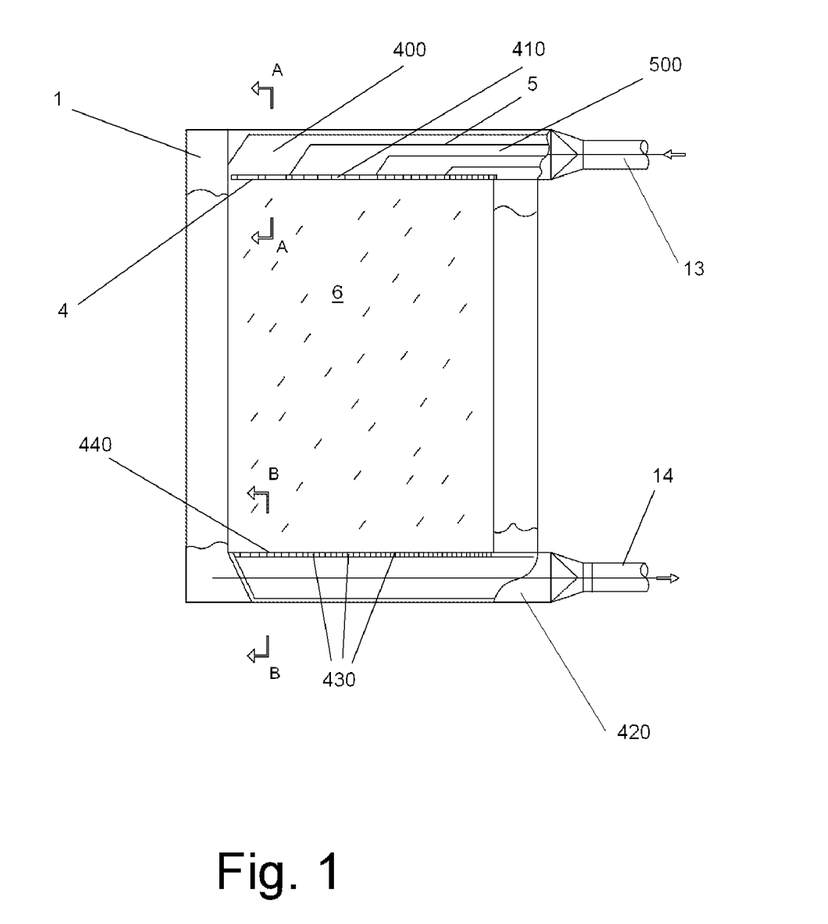
FIG. 1 is an elevation view, with cut outs, of a single window equipped with the invention.
Figure 2A:
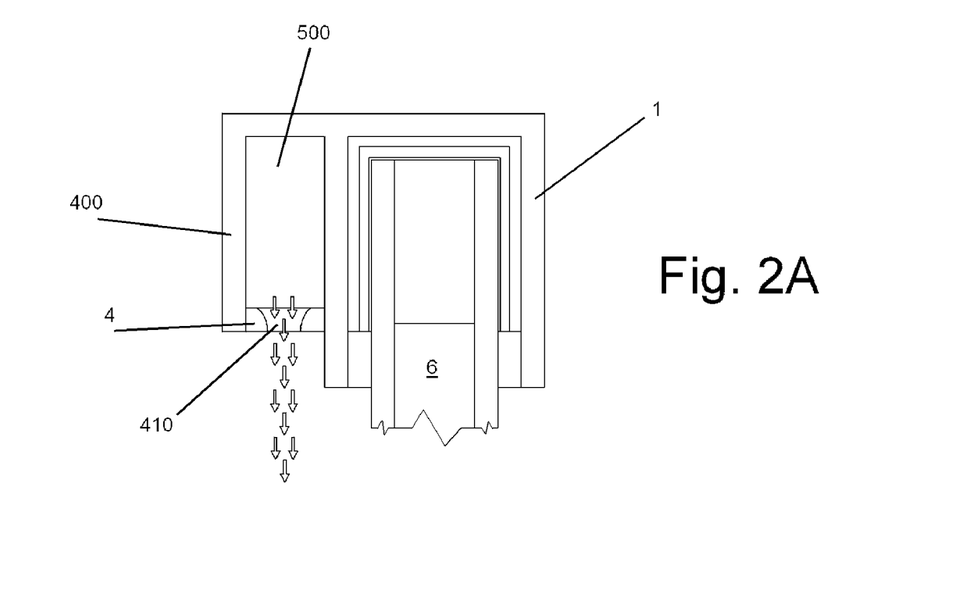
FIG. 2A is cross-sectional view along line A-A of FIG. 1, showing the upper window frame and upper nozzle.
Figure 2B:
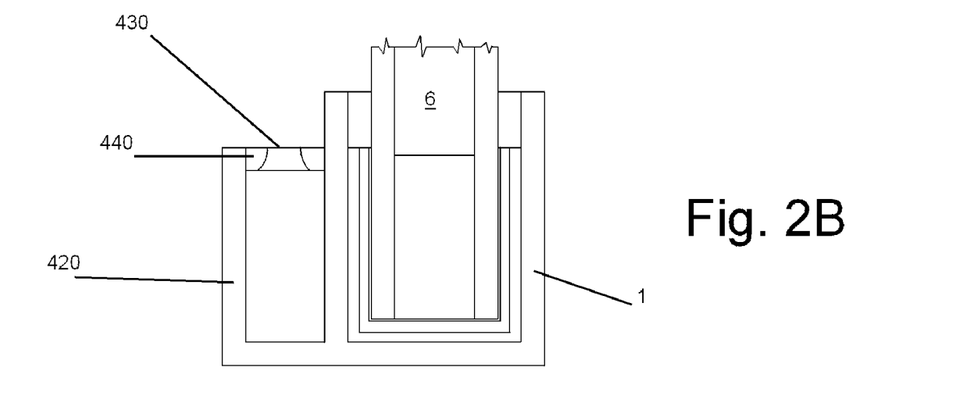
FIG. 2B is cross-sectional view along line B-B of FIG. 1, showing the lower window frame and lower nozzle.

FIG. 1 depicts a single window frame 1 window pane 6. First chamber 400 and second chamber 420 are mounted on opposite sides of window frame 1, preferably above and below window pane 6. First chamber 400 is connected at one end to first duct 13 and has perforations 410 along wall 4. Air distribution manifold 500 is preferably located in first chamber 400. Vanes 5 are strategically located within air distribution manifold 500 and direct air flow toward perforations 410, preferably for equal air distribution of the air curtain stream along the surface of window pane 6.

Second chamber 420 may be of identical construction as first chamber 400, but is connected to second duct 14 instead of first duct 13. Second chamber 420 has perforations 430 along wall 440. As shown in FIG. 1, while first chamber 400 contains air distribution manifold 500, second chamber is depicted without optional feature air distribution manifold 500.

In one mode of operation, an air flow enters first chamber 400 from first duct 13, and the air flow exits first chamber 400 through perforations 410, forming an air curtain stream across the surface of window pane 6. The air curtain stream enters second chamber 420 through perforations 430 and exits second chamber 420 through second duct 14.

In an alternate embodiment, instead of being above and below the window pane 6, first chamber 400 and second chamber 420 may be mounted on opposite sides of window pane 6.

While the window pane 6 shown in FIG. 1 is a double paned window, a common type of window, window pane 6 could be a single pane of glass or multiple panes. Further, the invention may be implemented on a door, wall or ceiling, creating an air curtain stream across any of these.

According to the invention when a thermal energy difference attempts to penetrate from the exterior of the building in to the interior, the thermal energy would have to overcome the insulating resistance of window pane 6 and also two layers of air, namely the layer of the air curtain and an additional layer of air between the air curtain and window pane 6.

Since the layer of air is at least 10 times less conductive then the glass the energy savings on heating or cooling can be substantial.

Figure 3:
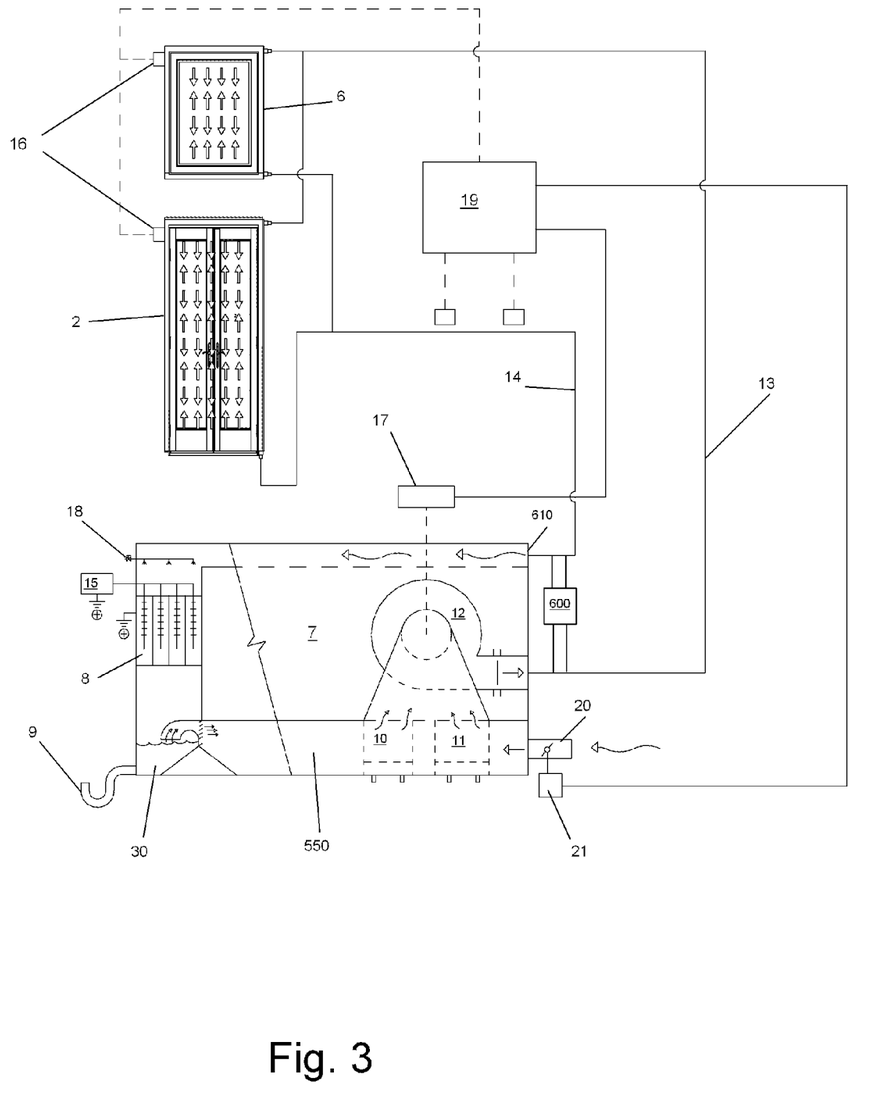
FIG. 3 is block diagram of the invention.

FIG. 3 shows a plan layout of the invention. Blower 12 of air handling unit 7 sends a forced air stream into duct selector 600. In a preferred embodiment, duct selector 600 allows the system to use first duct 13 and second duct 14 as alternating supply and return ducts for the air stream. One selection for duct selector 600 would direct the air stream from blower 12 into first duct 13, while second duct 14 would be connected to return intake 610 of air handling unit 7. Another selection for duct selector 600 would direct the air stream from blower 12 into second duct 14, and first duct 13 would be connected to return intake 610.

Sensors 16 determine whether windows 6 or doors 2 are open or closed and provide the information to the programmable logic controller (PLC) 19 that operates variable frequency drive 17, controlling the speed of blower 12. When the windows 6 are closed, a lower air volume is needed to provide the air curtain stream over the surface of window pane 6.

After the air stream enters return intake 610 of air handling unit, the air stream enters wet electrostatic precipitator (WESP) 8. WESP 8 is a down-flow continuously self-cleaning precipitator with at least one ionizing electrode and collecting surface within a chamber. High voltage transformer 15 provides the current for WESP 8. As is known in the art, the ionizing electrode of WESP 8 will apply a charge to dust particles and other particles in the air stream, including particles as small as 0.01 micron size, bacteria, and viruses. The charged particles are attracted to the collecting surface of WESP 8. Preferably, WESP 8 is continuously cleaned by a fine water mist injected into the WESP chamber by spray manifold 18. The particles are washed off of the collecting surface by collected water droplets and as a slurry by gravity, are collected in bottom sump 30 and drained out through air lock 9 for disposal.

Clean air leaves the WESP chamber through exhaust 550 and, depending upon thermostat setting as in any conventional air handling unit, may passed directly into blower 12, or may first be heated in heater 10 or cooled in air conditioning unit 11, after which the clean air would then pass into blower 12.

External air may be introduced into the system via intake duct 20, as controlled by damper 21. Damper 21 is controlled by signals from programmable logic circuit 19, which may receive data from a $CO_2$ sensor, a volatile organic compound sensor, or other sensors as may be desired. $CO_2$ sensors, volatile organic compound sensors, and other sensors each monitor the internal air quality and external air quality.

Figure 4:
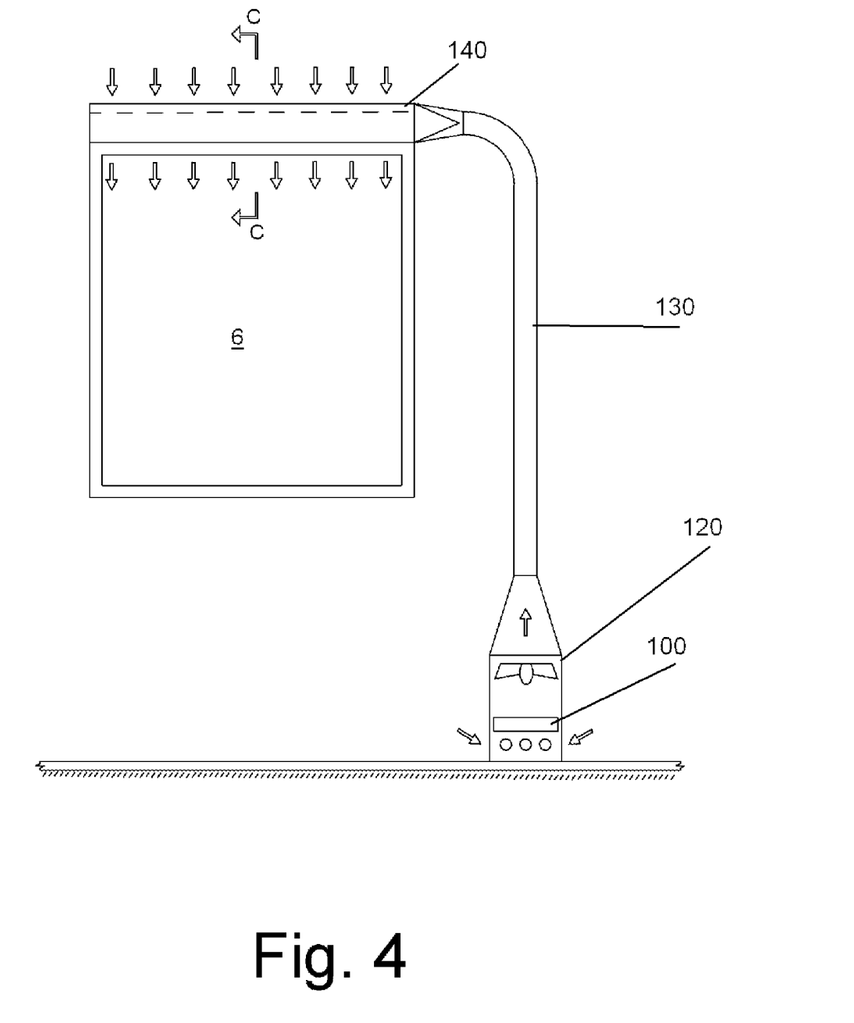
FIG. 4 is a plan view of the invention showing the conversion of small high pressure air flow to a large volume of the air flow at lower pressure based on an air-ejector design.

FIG. 4 depicts an alternate embodiment of the invention in the form of an air curtain system that converts a small, high pressure air flow to a large volume air flow at lower pressure based on an air-ejector design. This embodiment comprises of filter 100, high pressure blower 120, connecting duct 130 and nozzle manifold 140.

Figure 5:
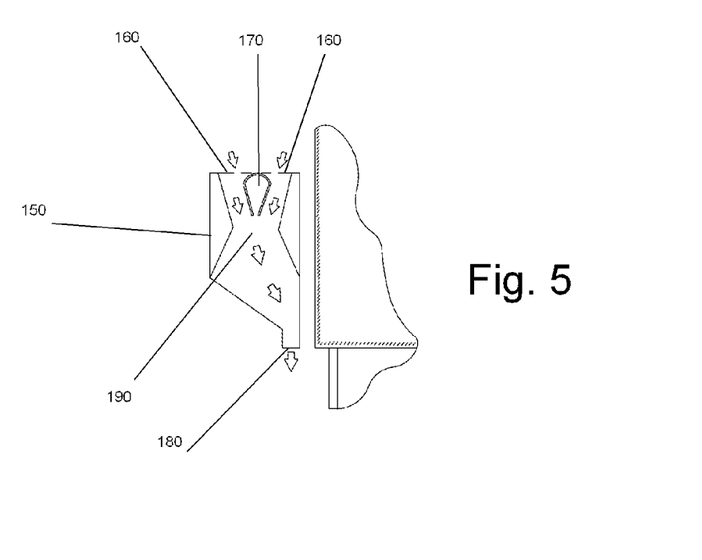
FIG. 5 is a cross-sectional view along line C-C of FIG. 4, showing an air manifold mounted in front of a window.

As shown in FIG. 5, nozzle manifold 140 comprises of housing 150 located above the window, preferably along its entire width, and the internal surface is shaped as the classical Venturi throat 190. The top wall of housing 150 has two longitudinal openings 160, high pressure air nozzle 170, and at the bottom of housing 150 there is a low pressure longitudinal exhaust 180 for the delivery of the air stream downwards along the surface of the window glass. Longitudinal openings 160 allow the entry of ambient air.

During operation, air enters high pressure blower 120 via disposable filter 100 and delivered under high pressure via connecting duct 130 to the air nozzle 170 and is directed into the Venturi throat 190 where the air flow is accelerated, creating negative pressure and promoting the influx of extra air from the room via openings 160, thus multiplying the original air volume delivered by the blower 120. The larger air volume provides much better air mixing in the room when it is used as a part of the improved HVAC system.

Figure 7:
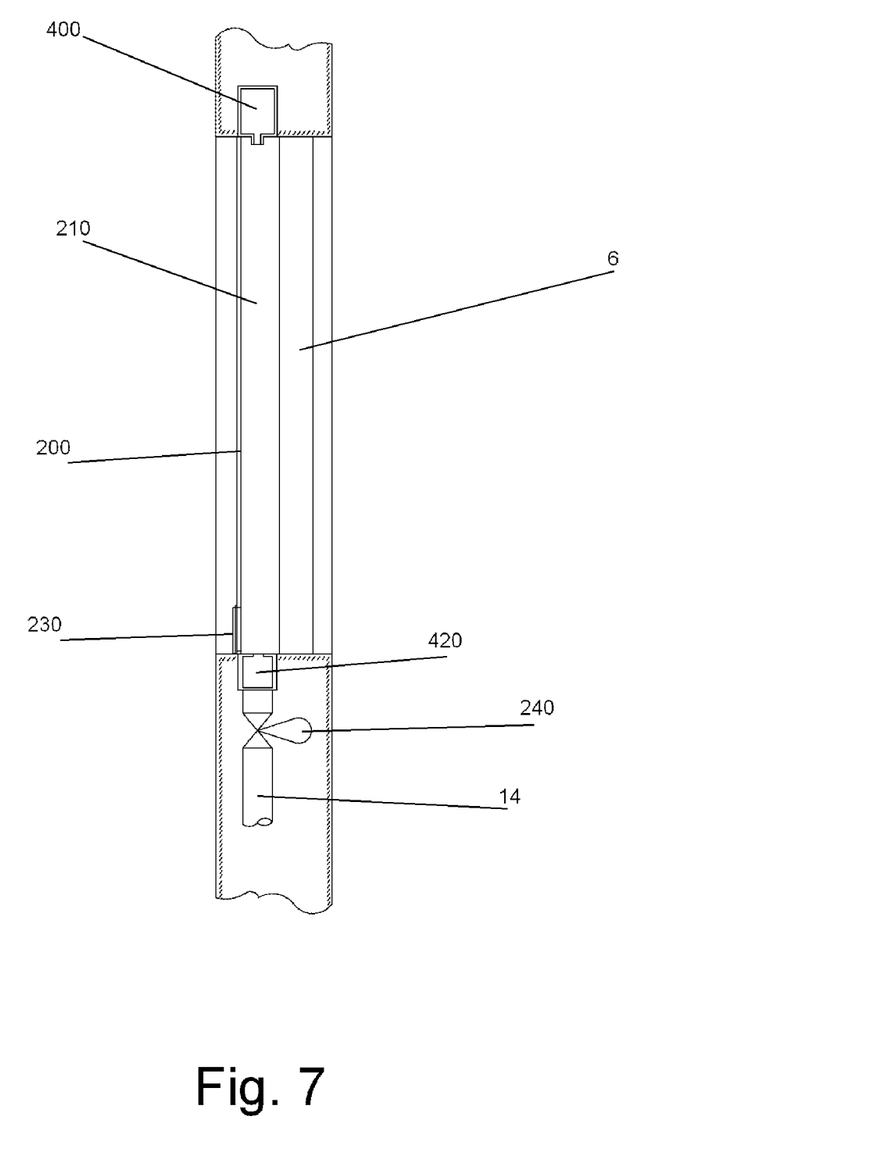
FIG. 7 is a cross-sectional view of a window constructed with an additional glass pane installed to create the dedicated channel for the air curtain.

Another embodiment of the invention is depicted on the FIG. 7, where in order to deliver air flow to the window with low velocity while at the same time ensuring equal flow distribution of air along the glass window 6, and to prevent any cross flow disturbance of the air curtain, an additional glass pane 200 is installed thus creating the dedicated channel 210 for the air curtain.

In this embodiment, first chamber 400 is located at the top of channel 210 and second chamber 420 is located at the bottom of channel 210. Air flow enters first chamber 400 from first duct 13 and exits second chamber 420 through second duct 14, as described above. This embodiment provides a damper 240 between second chamber 420 and second duct 14, where the return air flow may be blocked from entering second duct 14. Glass pane 200 is equipped with flexible cover 230 acting as a release valve that opens under air pressure to direct the air flow into the room when damper 240 is closed preventing air from entering second duct 14. Return air flow can then follow traditional HVAC direction via return registers located in the room.

As an additional feature, this embodiment assists in providing forced air temperature adjustment to the location. When the temperature in a room is at a desired level, damper 240 will remain open and air will go into second duct 14 for return to the air handling unit 7. When the thermostat determines a need for heated or cooled air, such temperature controlled air will be circulating through the system from the blower into the first duct. Damper 240 will close and under positive pressure flexible cover 230 will open to let the conditioned air enter the room to satisfy the desired temperature. Once the desired temperature is reached, damper 240 will open again allowing the air flow to return to the air handling unit 7.

Figure 8:
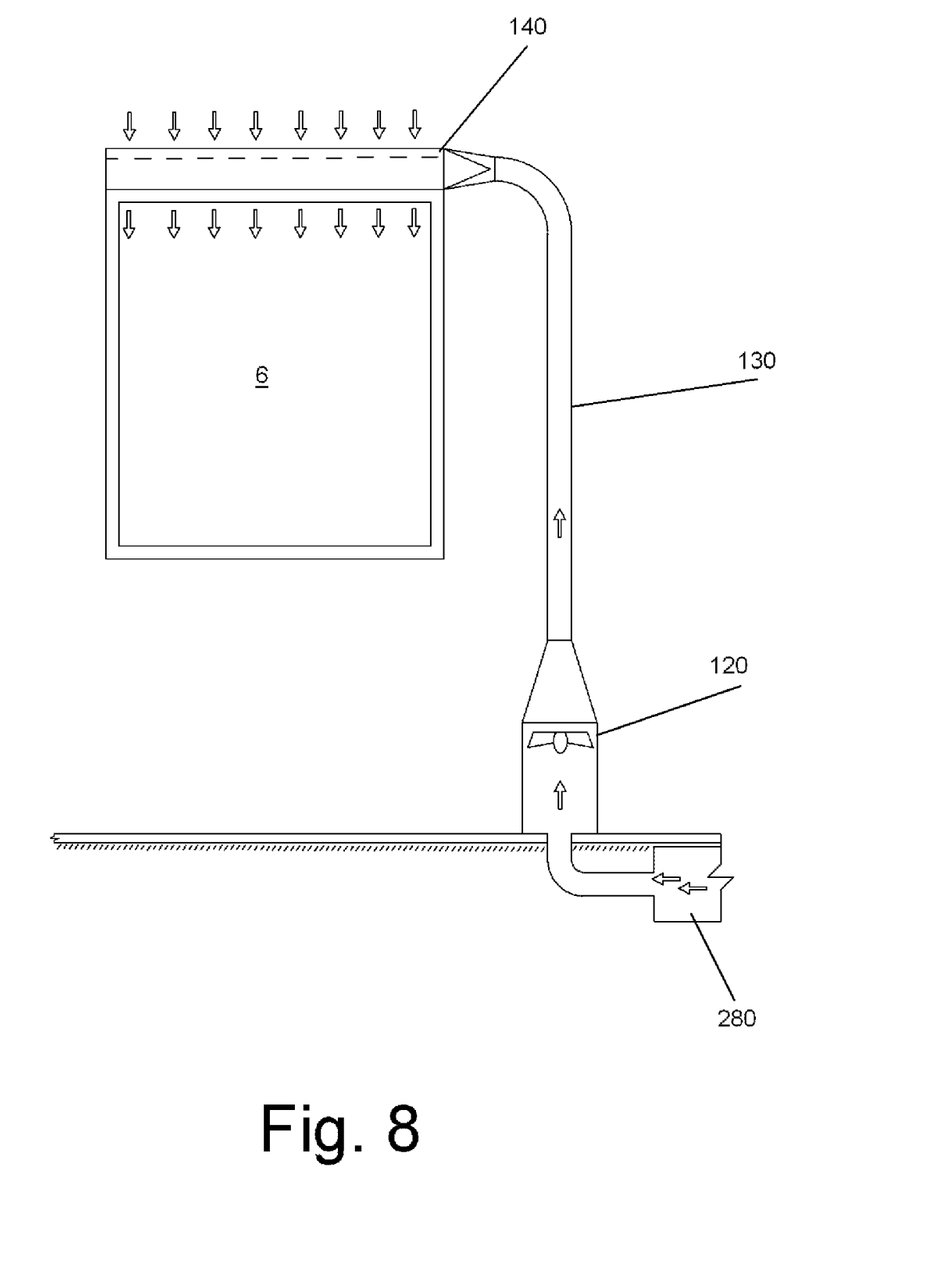
FIG. 8 is a plan view of the invention showing the high velocity delivery of air to a window using a local blower booster and nozzle with multiplying effect.

As depicted in FIG. 8, for further improvement and energy savings, the originally proposed high velocity delivery of the air to the windows can be modified whereas the air would be delivered via larger duct 280 with a lower pressure drop along the way but can be connected to high pressure blower 120 as show in FIG. 4.

Figure 6:
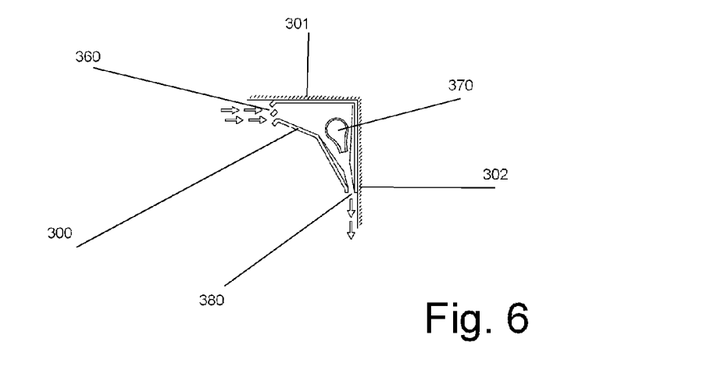
FIG. 6 is a cross-sectional view of an air delivery manifold on top at the ceiling which is constructed in the shape of the crown molding.

As depicted on FIG. 6, for further energy savings, the air curtain may be delivered along the interior walls of a building by placing an air delivery manifold 300 in a corner of ceiling 301 and wall 302. Air delivery manifold 300 may be in the shape of crown molding or other architecturally similar component, to disguise its functional nature. The interior of air delivery manifold 300 has the same internal design as nozzle manifold 140, with openings 360, high pressure air nozzle 370 and low pressure exhaust 380 corresponding to the functions of longitudinal openings 160, high pressure air nozzle 170 and low pressure exhaust 180.

Figure 9:
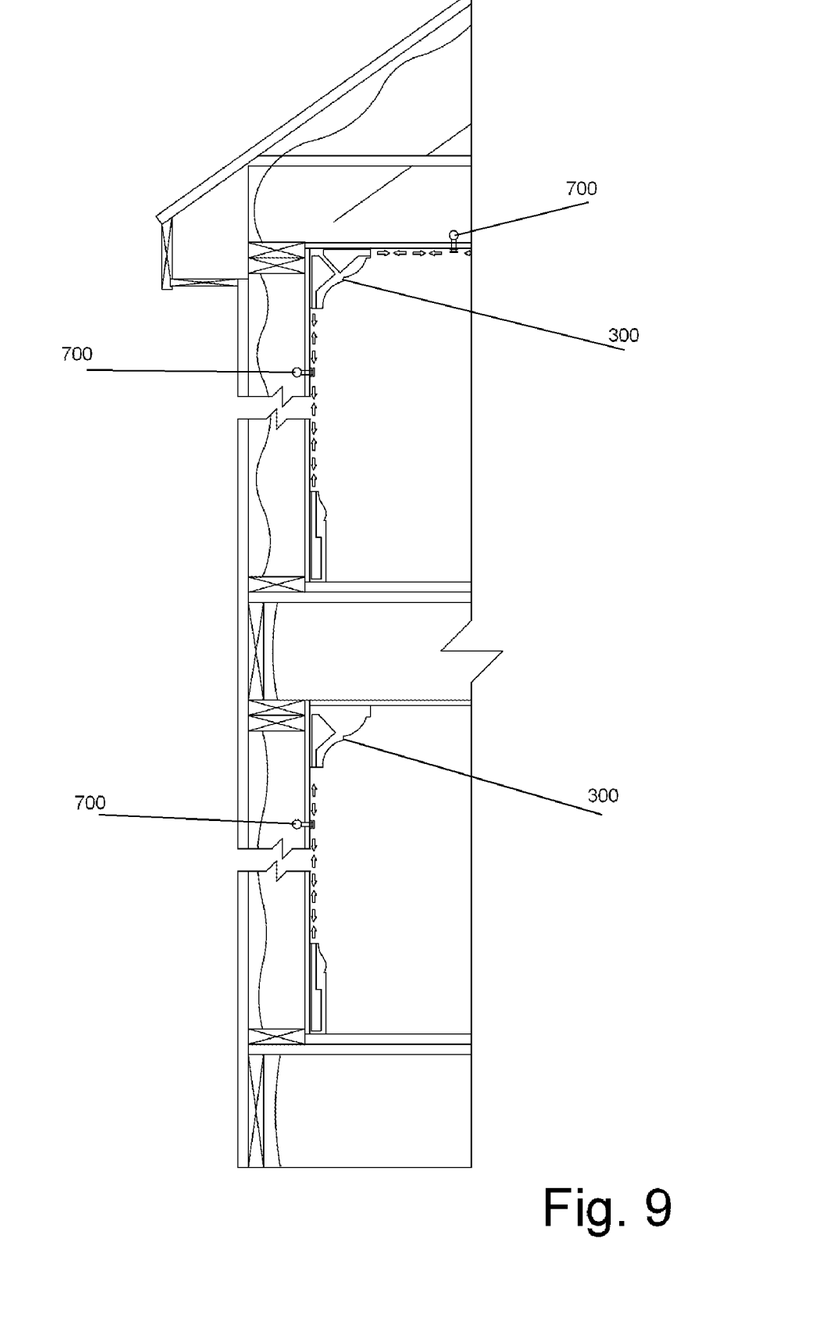
FIG. 9 is a cross-sectional view of the invention in a two story building, showing air curtains on walls, windows and the second floor ceiling.
Figure 10:
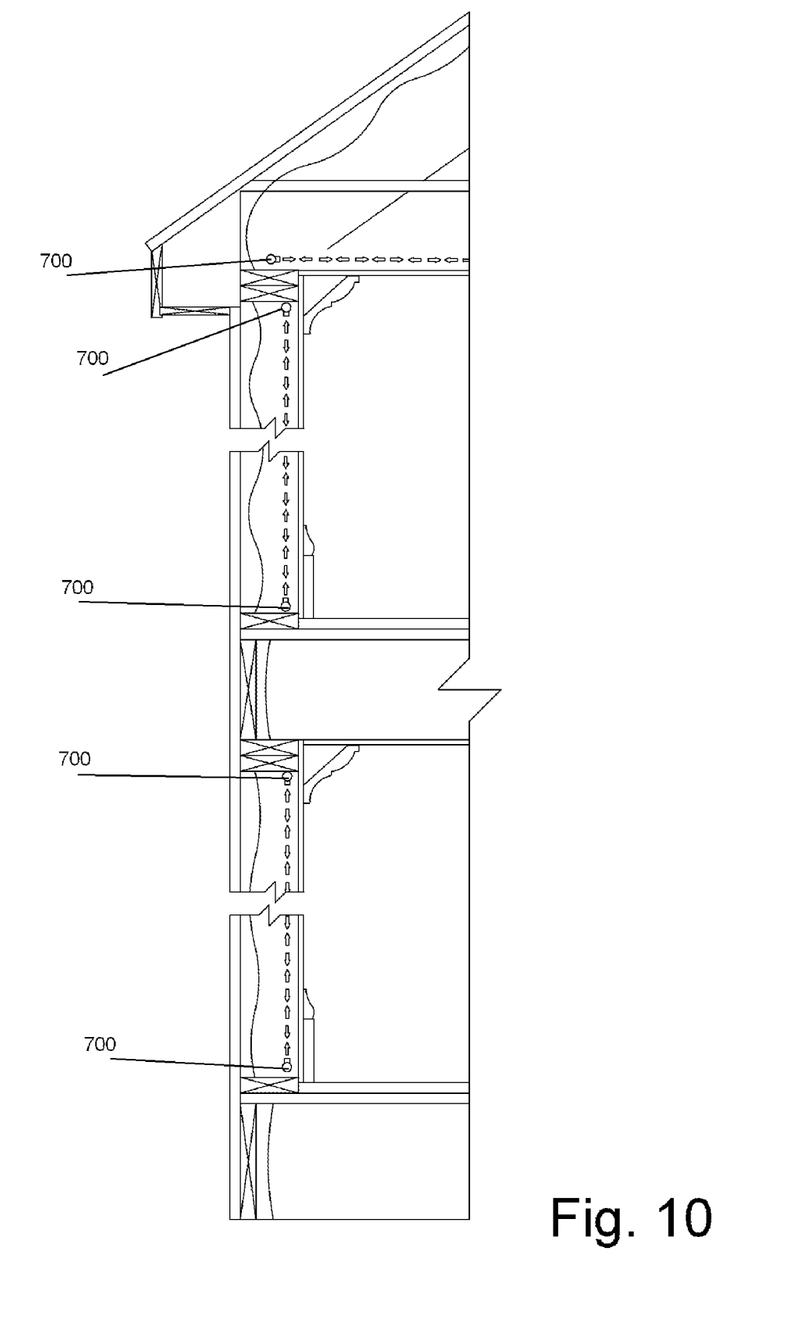
FIG. 10 is a cross-sectional view of the invention in a two story building, showing an alternate embodiment
Figure 11:
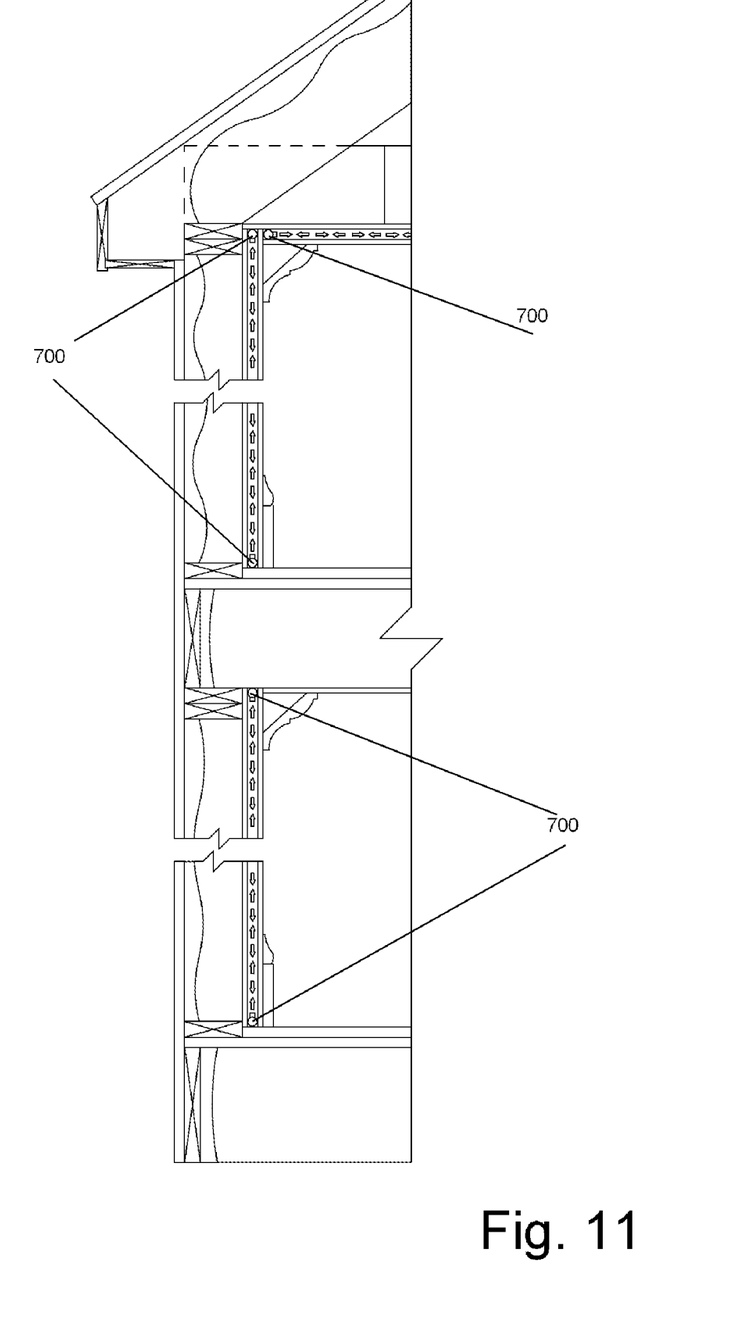
FIG. 11 is a cross-sectional view of the invention in a two story building, showing another alternate embodiment, with the invention installed within walls and ceiling.

FIGS. 9, 10 and 11 show the air curtain technology used for the reduction of energy loses via walls and ceilings of a building, adding flexibility to a designer by allowing the location of the air curtain not only in open areas, but also in cavities 710 within walls and/or ceilings. The air curtain cavities 710 could be constructed as part of new construction, from the same materials as in use for the structure. Manifold units 700, similar in construction to air delivery manifold 300 and nozzle manifold 140, can be located as desired inside interior walls or on the surface of interior walls, as well as on the surface of a ceiling, or in an attic space.

While certain novel features of the present invention have been shown and described, it will be understood that various omissions, substitutions and changes in the forms and details of the device illustrated and in its operation can be made by those skilled in the art without departing from the spirit of the invention.

We claim:

1. An air curtain system comprising:
   an air handling device;
   an air distribution manifold, connected to the air handling device by a first elongated duct, the air distribution manifold having an elongated opening capable of creating an air curtain in at least one direction; and
   an electrostatic precipitator connected to the air handling device.

2. The air curtain system of claim 1, further comprising:
   An air return manifold, connected to the electrostatic precipitator by a second elongated duct, the air return manifold located to receive an air curtain created by the air distribution manifold.

3. The air curtain system of claim 1, where the air handling device is located at a distance remote from the air distribution manifold.

4. The air curtain system of claim 1, where the air handling device comprises:
   A blower or fan; and
   A temperature adjusting air conditioner.

5. The air curtain system of claim 1, where the air distribution manifold comprises:
   an elongated chamber with a chamber input at an end and a plurality of chamber output perforations along one side;
   vanes within the chamber, directing an air flow to the plurality of chamber output perforations.

6. The air curtain system of claim 5, where the chamber output perforations are of different sizes, and the chamber output perforation sizes are larger the further they are from the chamber input.

7. The air curtain system of claim 4, where the temperature adjusting air conditioner comprises at least one of a heating or air cooling device.

8. The air curtain system of claim 1, where the air distribution manifold is constructed as a Venturi multiplier, converting small volume of high pressure air into larger volume of lower pressure stream.

9. The air curtain system of claim 1, where the air distribution manifold is contained within a decorative molding.

10. The air curtain system of claim 2, further comprising:
a duct selector connected to the first and second elongated ducts and to the air handling device and the electrostatic precipitator, allowing an output from the air handling device to be directed to the second elongated duct and an output from the first elongated duct to be directed to an intake of the electrostatic precipitator, so that the air return manifold is capable of creating an air curtain and the air distribution manifold is capable of receiving the air curtain.

11. The air curtain system of claim 10, where the duct selector is controlled by a control circuit.

12. The air curtain system of claim 2, where the air distribution manifold and the air return manifold are located within a wall.

13. The air curtain system of claim 2, where the air distribution manifold and the air return manifold are located within a ceiling.

\* \* \* \* \*